United States Patent [19]

Viviani

[11] Patent Number: 4,905,559

[45] Date of Patent: Mar. 6, 1990

[54] MUSICAL ELECTRONIC LOCK

[76] Inventor: Gary L. Viviani, 6675 Windwood La., Beaumont, Tex. 77706

[21] Appl. No.: 170,874

[22] Filed: Mar. 21, 1988

[51] Int. Cl.[4] .......................... G06F 7/04; G10H 7/00

[52] U.S. Cl. .................................. 84/609; 340/825.31; 340/825.34; 361/172; 70/278

[58] Field of Search ....................... 84/1.01; 340/825.3, 340/825.31, 825.32, 825.33, 825.34, 365 E, 384 E; 361/172; 307/10 R, 10 AT; 70/278

[56] References Cited

U.S. PATENT DOCUMENTS

| | | | |
|---|---|---|---|
| 4,249,245 | 2/1981 | Nakanishi et al. | 340/384 E X |
| 4,463,349 | 7/1984 | Mochida et al. | 340/825.32 |
| 4,499,462 | 2/1985 | Stoesser et al. | 340/825.31 |

*Primary Examiner*—Stanley J. Witkowski
*Attorney, Agent, or Firm*—Kenway & Crowley

[57] ABSTRACT

A musical electronic lock 10 is provided to unlock a locking means 12. The musical electronic lock 10 comprises a digital tone generation circuit 20 and memory 18 for electronically producing a musical melody while an electronic logic circuit 16 decodes responses from a user. Responses are compared by the electronic logic circuit 16 with an electronically stored combination and timing information in the memory 18. When successfully operated, the user will activate a switch or switches 24 in a key input unit 14 to input a confidential alphameric code when prompted by particular notes of an electronically synthesized musical melody or other sequenc of audible tones generated by a speaker 22. The necessary information to operate the musical electronic lock 10 is significantly more difficult to disseminate than conventional combinations yet it is is far simpler to operate, due to the easy to remember musical melody.

7 Claims, 2 Drawing Sheets

MUSICAL ELECTRONIC LOCK

BACKGROUND OF THE INVENTION

1. Field of the Invention

This invention relates to electronic locking systems and, more particularly, to an electronic lock system which depends on time-dependent user response codes which are prompted through audible (musical) tones.

2. Description of Prior Art

Presently, electronic locks operate passively, except to signal successful or unsuccessful operation. The operator must input information to the lock via electronic signals which are associated with a keypad, magnetic media or other code transmittal device. Other electronic locking devices are actuated by sophisticated scanning apparatus for producing unique electronic signals associated with an individual's body (fingerprint), voice or detectable forms of radiation. Such devices are inherently expensive and in many cases prone to error.

Most commonplace electronic locks are subject to fraudulent use if the electronic code (numerical or magnetic) is transferred to an unauthorized user. Conventional combinations are easy to transfer to others, and easy to forget. Physical keys (magnetic or otherwise) are usually inconvenient to carry or subject to loss or theft. Typical examples of these sorts of electronic lock-related devices, and previously mentioned devices, are found in the following patents: U.S. Pat. No. 4,286,305 issued to Pilat, U.S. Patent RE-29846 issued to Genest, U.S. Pat. No. 4,079,605 issued to Bartels, U.S. Pat. No. 3,821,704 issued to Sabsay, U.S. Pat. No. 4,031,434 issued to Perron, U.S. Pat. No. 3,184,937 issued to Sher, U.S. Patent RE-29341 issued to Peters, U.S. Pat. No. 3,639,906 issued to Tritsch, and U.S. Pat. No. 3,660,729 issued to James.

Electronic synthesis of music by both digital and analog means is well known. Digital methods are the most recent advancement and are discussed in U.S. Pat. No. 4,108,036 issued to Slaymaker and other sources. Analog electronic synthesis of sounds depends on oscillator circuits which are well known.

The device of this invention relies on digital logic circuitry which can take the form of discrete elements, or is equivalently synthesized with more complex components, such as computers which are suitably programmed. To keep track of digital information, necessary for the control and functions of the device, well-known methods for storage of digital information are utilized.

SUMMARY OF THE INVENTION

The invention relates to an electronic circuit which is made to function in a particular way as a "Musical Lock" or "Musical Electronic Lock". It is possible to produce such a device in either of two equivalent manners. One can produce a dedicated electronic circuit that performs only Musical Lock required operations, or one can program a computer, having appropriate peripheral equipment, to function as a Musical Lock. When cost is a factor, the former is the preferred realization. However, the latter realization is equivalent except for the fact much of the available additional computer resources are not utilized. In accordance with the invention the user activates the device by an external operation (actuating a switch, or equivalent) which initializes (executes a start-up routine) the Musical Lock. The Musical Lock then produces audible tones electronically and is able to electronically monitor which tone is concurrently being emitted. While the Musical Lock is emitting a sequence of predetermined preprogrammed tones, the user must push an appropriate switch or key on a keyboard while a particular tone is being emitted. An equivalent appropriate response for some tone would be to activate no switch at all. Which switch must be activated (or not activated) at which tone is predetermined (preprogrammed) in electronic memory. The Musical Lock has the ability to determine if the correct switch or key on a keyboard is activated at the correct time. A successful operation of the musical lock results when a sequence of particular switches (keys) are activated at various non-consecutive (or consecutive) predetermined specific tones. The consecutive tones will usually take the form of a musical melody that is more easily remembered by the user, making it simple to actuate the correct switch (key on a keyboard) at the correct time. This causes the Musical Lock to generate an actuation signal which will actuate a locking mechanism and unlock a lock coupled to the Musical Lock.

DESCRIPTION OF THE PREFERRED EMBODIMENT

Figure 1:
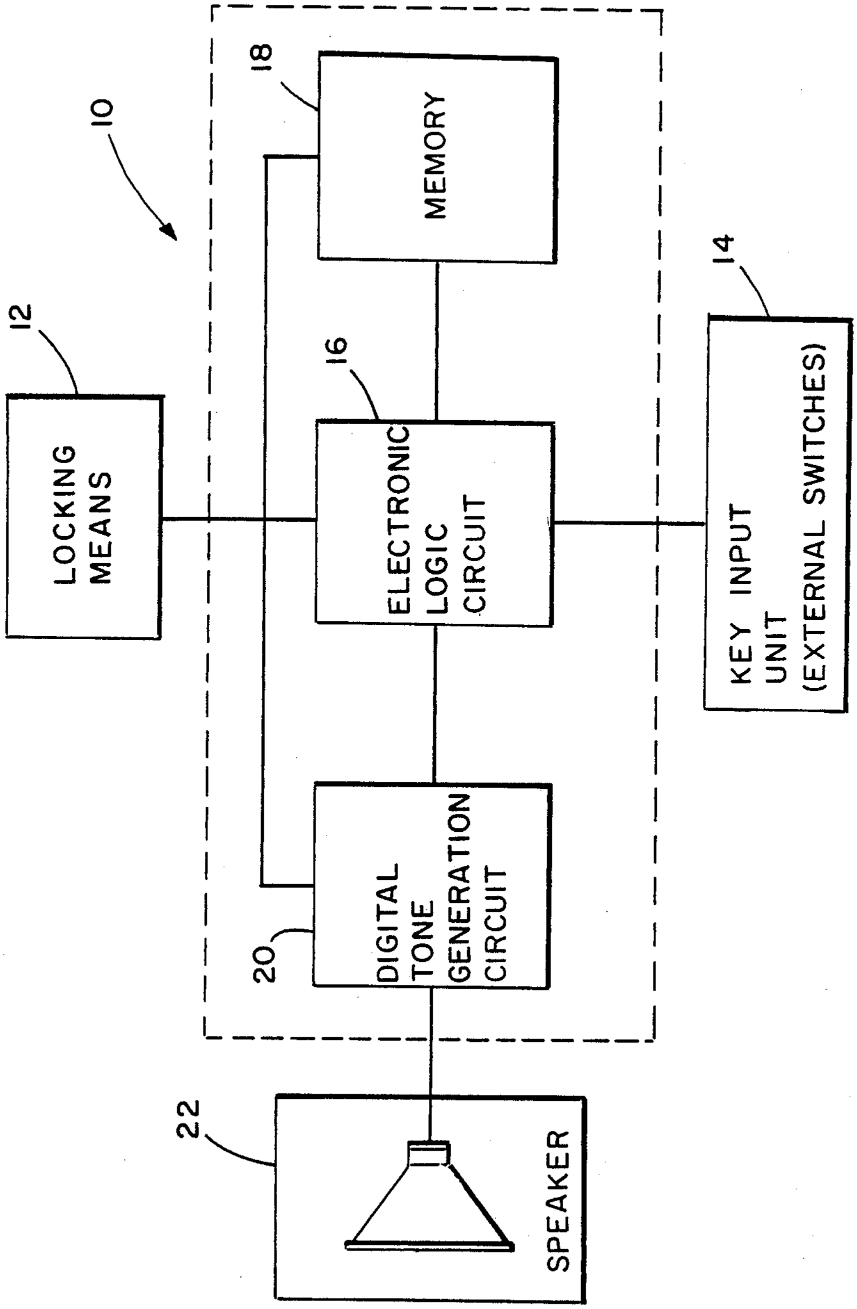
FIG. 1 is a block diagram indicating the salient, necessary features of the Musical Lock in accordance with the principles of this invention.

The musical electronic lock 10 is illustrated in the block diagram of FIG. 1. The musical electronic lock 10 is provided to actuate and unlock a locking means 12. The musical electronic lock 10 includes a key input unit 14 and an electronic logic circuit 16 which receives input signals from the key input unit. The musical electronic lock 10 also includes a memory 18 which stores information to be accessed by the electronic logic circuit 16. The electronic logic circuit 16 and the memory 18 are both coupled to a digital tone generation circuit 20 which facilitates the generation of predetermined audible tones in a speaker 22. When a user at the key input unit 14 sends the proper input signal or signals to the electronic logic circuit 16 during the generation of a predetermined tone or tones, the electronic logic circuit 16 will send an actuation signal to unlock the locking means 12.

The musical electronic lock 10 has the following specific, essential characteristics. The musical lock 10 has through the digital tone generation circuitry 20 the ability to produce a predetermined musical melody or sequence of audible tones. The musical electronic lock 10 also has the ability to determine through the electronic logic circuit 16 and the memory 18 if an appropriate switch in the key input unit 14 is activated at an appropriate predetermined time, when prompted by a particular audible tone from the speaker 22 at a particular time. As a result, the musical electronic lock 10 unlocks the locking means only in the event that a user actuates a predetermined sequence of specific switches from the group of several switches in the key input unit 14, at predetermined times associated with particular tones in an uninterrupted sequence of tones. If the user fails to actuate the proper switch in the input unit 14 at the proper time, or operates the wrong switch in the input unit at any time, the musical electronic lock 10 will fail to open. The sequence of tones, the number of tones and the particular sequence, timing and total number of switch actuations required to unlock the locking means 12 is re-programmable and unaccessible to the user. This information is stored in the memory 18 which constitutes an externally unaccessible portion of the musical electronic lock 10. The ultimate objective of the musical electronic lock 10 is to change state (unlock) in response to a proper actuation sequence by the user. Changing state corresponds to changing an electronic voltage, current, magnetic field, or other form of radiation, from a stable state that remains in effect as long as the musical electronic lock 10 is not properly actuated to a revised state that will temporarily or permanently remain in effect only after a successful actuation of the musical electronic lock. This change of state can be sensed by other electronic, mechanical, optical or other media and can be used to actuate a locking means 12 such as, for example, a mechanical plunger. The musical electronic lock 10 can be, for example, part of an existing computer system. Thus, the musical lock can function purely electronically. A successful actuation can allow the user access to computer-related resources, whereas an unsuccessful actuation can deny the user the right to utilize certain resources, including the computer in its entirety. A tone is defined to be any sound of definite pitch and vibration.

A switch is a device for making, reading or changing the connections in an electrical circuit. Also, in the context of the musical electronic lock 10, actuating keys of the input unit 14 such as, for example, a keyboard or touching the keys on a touchtone phone are also considered as switching operations which are user initiated and controlled.

Figure 2:
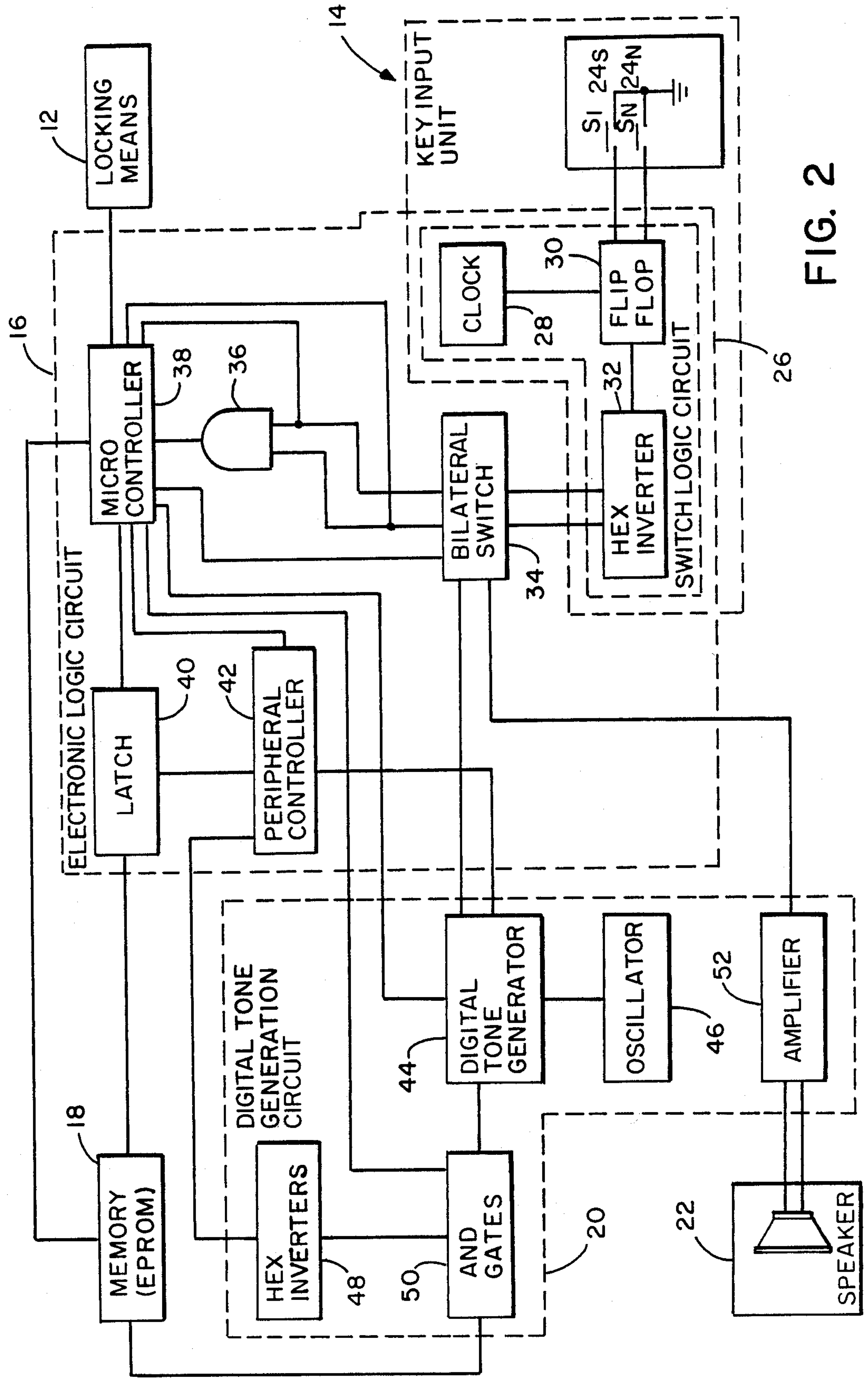
FIG. 2 is a circuit diagram of the preferred embodiment of the invention illustrated in the block diagram of FIG. 1.

By referring to FIG. 1 and FIG. 2, the means for achieving the above-described necessary capabilities of the musical electronic lock 10 can be readily understood.

In FIG. 2 there is shown the preferred embodiment of the musical electronic lock 10 illustrated in the block diagram of FIG. 1. The key input unit 14 is provided with a plurality of switches **24*o*–24*n* for inputting signals to the electronic logic circuit 16. The signals from the input unit 14 are initiated by a user upon depression of a designated switch or switches 24. The key input unit 14 also includes a switch logic circuit 26 which is coupled to the switches 24. The switch logic circuit 26 includes a clock 28 which is coupled to drive a flip-flop 30 and a hex inverter 32 driven by the output of the flip-flop. The switch logic circuit 26 isolates the switches 24 from noise signals that may be otherwise generated. Consequently, a reliable switch input signal is generated when a switch 24 is depressed by a user. The flip-flop 30 of the detection circuit 26 may be, for example, a Dual D-type positive edge triggered flip-flop with preset and clear and the hex inverter 32 may be a hex inverter buffer-driver having open collector high voltage outputs. The key input unit 14 with its associated circuitry may be, for example, a standard keyboard or telephone touch pad. The key input unit 14 is coupled to the electronic logic circuit 16 by a bilateral switch 34, which functions as a semiconductor relay, at the output of the switch logic circuit 26. The bilateral switch 34 is coupled to an AND gate 36 and a microcontroller 38. The microcontroller 38 is in the heart of the electronic logic circuit 16 in that it reacts to interrupt signals which are generated by depressing the switches 24 of the key input unit 14. When a switch is activated (depressed), the appropriate signal from the bilateral switch 34 goes low. This forces the interrupt signal to the microcontroller 38 also to go low (active). Therefore, whenever a switch is depressed, the microcontroller 38 executes an interrupt routine to determine which switch was depressed. The microcontroller 38 is a programmable microcontroller and may be the type known as the Intel 8031**.

A latch 40 is coupled to the microcontroller 38. The latch 40 facilitates accessing of the memory circuit 18 by the microcontroller 38. A peripheral controller 42 is also coupled to the latch 40 and the microcontroller 38. The peripheral controller 42 functions as a general I/O component which augments the available number of outputs from the microcontroller 38 in order to drive the digital tone generation circuit 20. The peripheral controller 42 may be, for example, the type known as the Intel 8255 peripheral controller. The microcontroller 38 and peripheral controller 42 and other associated circuitry in the electronic logic control circuit 16 may be all in one unit such as, for example, the commercially available central processing unit known as the Intel 8088 microprocessor or the Intel microprocessor 8096.

The digital tone generation circuit 20 includes a digital tone generator 44. The digital tone generator 44 is driven by an oscillator 46 and is coupled to the peripheral controller 42. The digital tone generator 44 may be, for example, a 76496 Texas Instruments programmable digital complex tone generator which produces tones of desired frequency and volume in response to digital inputs. The digital tone generator 44 is also coupled to the peripheral controller 42 through hex inverters 48 and AND gates 50. The hex inverters 48 and AND gates 50 provide enabling signals to the digital tone generator 44. The digital tone generator 44 is also coupled to speaker 22 through the bilateral switch 34 and an amplifier 52 which drives the speaker for audible output.

Accordingly, the electronic logic circuit 16 senses inputs from the external switches 24 of the key input unit 14, commands the digital tone generation circuit 20 to produce tones and concurrently monitors which tone is being produced and if and when any switches are being actuated. The memory 18 of the musical electronic lock 10 which is coupled to the electronic logic circuit 16 and the digital tone generation circuit 20 is a standard Eprom such as, for example, the Intel 2764 Eprom memory which is reprogrammable. The memory 18 stores the codes required for producing a musical melody with the digital tone generator 44. The memory 18 also stores the interrupt procedures for the microcontroller 16 which determine if appropriate switches 24 are activated at the proper time during the melody or equivalently if appropriate switches 24 were not struck at the appropriate time. That is, the memory 18 of the musical electronic lock 10 is necessary for storing information related to which tone to generate, at which frequency and for what duration, and for storing information related to the timing, sequence, and identity of user initiated switch actuations, in response to the tones. When in operation, a predetermined audible tone is generated by the digital tone generator 44 through the speaker 22. The tones generated by the generator 44 are monitored and identified by the microcontroller 38 as they are generated. When a signal is emitted from key input unit 14 after depression of a predetermined switch 24, a determination is made by the microcontroller 38 if the proper switch has been activated at the proper time and tone. If the correct switch or switches 24 from the key input unit 14 are depressed, signals therefrom will cause the microcontroller 38 to generate an actuation signal. The actuation signal generated by the microcontroller 38 will then actuate and unlock the locking means 12.

It should be understood that various changes and modifications can be made without departing from the spirit of the invention as defined in the following claims.

What is claimed is:

1. An electronic locking system responsive in operation to manually generated input response signals prompted by audible musical tones comprising:
   - means for initiating the production of a predetermined sequence of audible tones;
   - means for manually generating input signals during the production of said predetermined sequence of audible tones;
   - means for monitoring the time and duration of each of said audible musical tones and of each of said input signals; and
   - means responsive to said monitoring means for operating said locking system upon the generation of at least one input signal during the production of one or more of said audible tones.

2. an eletronic locking system as defined in claim 1 wherein said means for initiating the production of a predetermined sequence of audible tones includes a memory for storing any one of a plurality of predetermined sequences of audible tones.

3. An electronic locking system as defined in claim 2 wherein said means for manually generating input signals comprises a plurality of switches each of which upon keying thereof is connected to generate a predetermined specific input signal.

4. An electronic locking system as defined in claim 3 wherein said means for initiating the production of a predetermined sequence of audible tones includes a digital tone generation circuit for producing tone signals corresponding to said audible musical tones.

5. An electronic locking system as defined in claim 4 wherein said monitoring means includes a programmable microcontroller responsive to said input signals to execute an interrupt procedure to determine which of said plurality of switches is actuated at any given time.

6. An electronic locking system as defined in claim 5 including a speaker for converting said tone signals from said digital tone generation circuit into audible musical tones, said microcontroller being arranged to monitor and identify said tone signals as they are generated and to monitor and identify said specific input signals generated by keying of one or more of said switches and to produce an actuation signal for operating said locking system.

7. An electronic locking system as defined in claim 5 wherein said memory stores said interrupt procedures for said microcontroller.

* * * * *